Oct. 9, 1962 S. MATUSIAK 3,057,619
APPARATUS FOR SUPPORTING A ROLL FOR PROCESSING
Filed March 7, 1960 4 Sheets-Sheet 1

INVENTOR.
STANLEY MATUSIAK
BY Donald G. Dalton
ATTORNEY

INVENTOR.
STANLEY MATUSIAK
BY Donald G. Dalton
ATTORNEY

Oct. 9, 1962 S. MATUSIAK 3,057,619
APPARATUS FOR SUPPORTING A ROLL FOR PROCESSING
Filed March 7, 1960 4 Sheets-Sheet 3
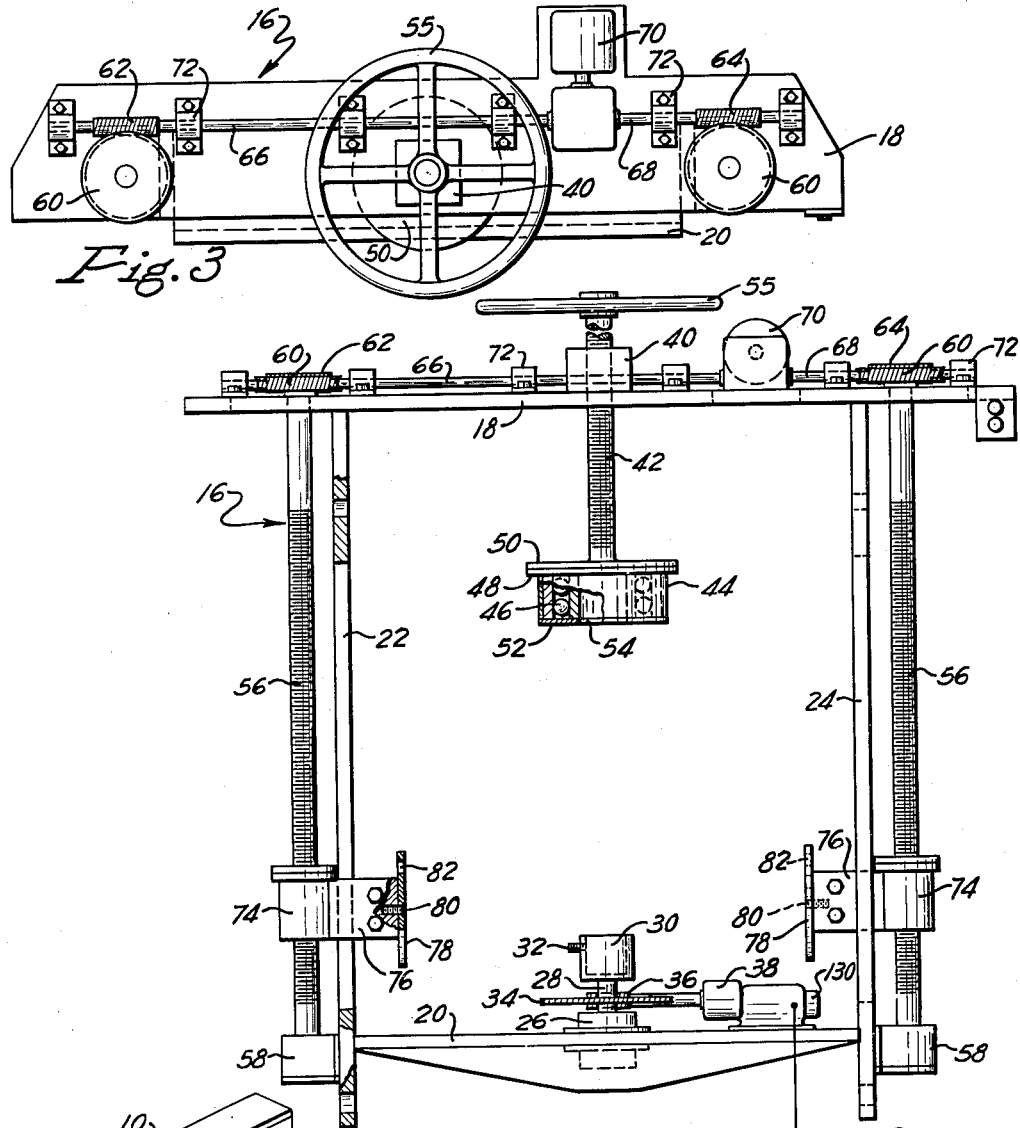
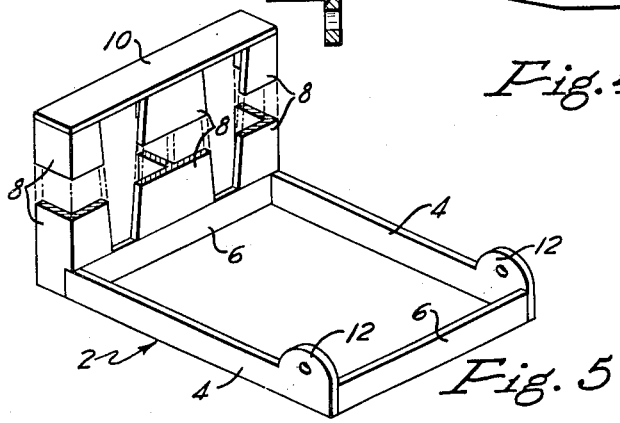
INVENTOR.
STANLEY MATUSIAK
BY Donald G. Dalton
ATTORNEY

United States Patent Office 3,057,619
Patented Oct. 9, 1962

3,057,619
APPARATUS FOR SUPPORTING A ROLL FOR PROCESSING
Stanley Matusiak, 5725 Jackson St., Gary, Ind.
Filed Mar. 7, 1960, Ser. No. 13,200
3 Claims. (Cl. 269—142)

The present invention relates generally to rolling mill roll processing apparatus and more particularly to a fixture or supporting apparatus especially suitable for supporting and manipulating twister guide rolls, entry guide rolls and the like while the inclined surfaces of the rolls are being processed.

In the hot rolling of steel billets, the billets are reduced by passing them through a series of roll passes arranged in a line. Between each pass the billets are guided by entry rolls and twister guide rolls. The twister guide rolls are under great pressure and subject to the rolling temperature (1400–1600° F.) of the billets and consequently the inclined roll surfaces which make contact with the billets to twist them into proper position for the next pass become worn after a relatively short time and, as a result, require frequent rebuilding.

Prior to my invention the roll was supported on end with its shaft inclined slightly to the vertical by means of a chain hoist while the rebuilding process was performed. While the roll was thus supported one side of the inclined bearing surface of the roll was preheated and then continuously rotated by one workman with a wrench or pair of tongs to present the preheated surface to a second workman. The second workman applied new metal onto the preheated surface by means of an oxyacetylene welding torch and a stellite welding rod to rebuild the worn roll surface.

The above described method of supporting and manipulating a twister guide roll for rebuilding was unsafe, excessively time-consuming, tedious and not conducive to high quality results. The latter disadvantage resulted from the fact that the roll could not be rotated at a uniform rate. When the rotation was too slow, an accumulation of weld material would result and the metal build-up would be excessive at that point. If the rotation was too fast or irregular, voids would develop between the roll surface and the weld thus causing a poor bond.

It is, accordingly, the primary object of my invention to provide an adjustable apparatus for securely supporting and controllably manipulating a twister guide roll for rebuilding purposes.

Figure 2:
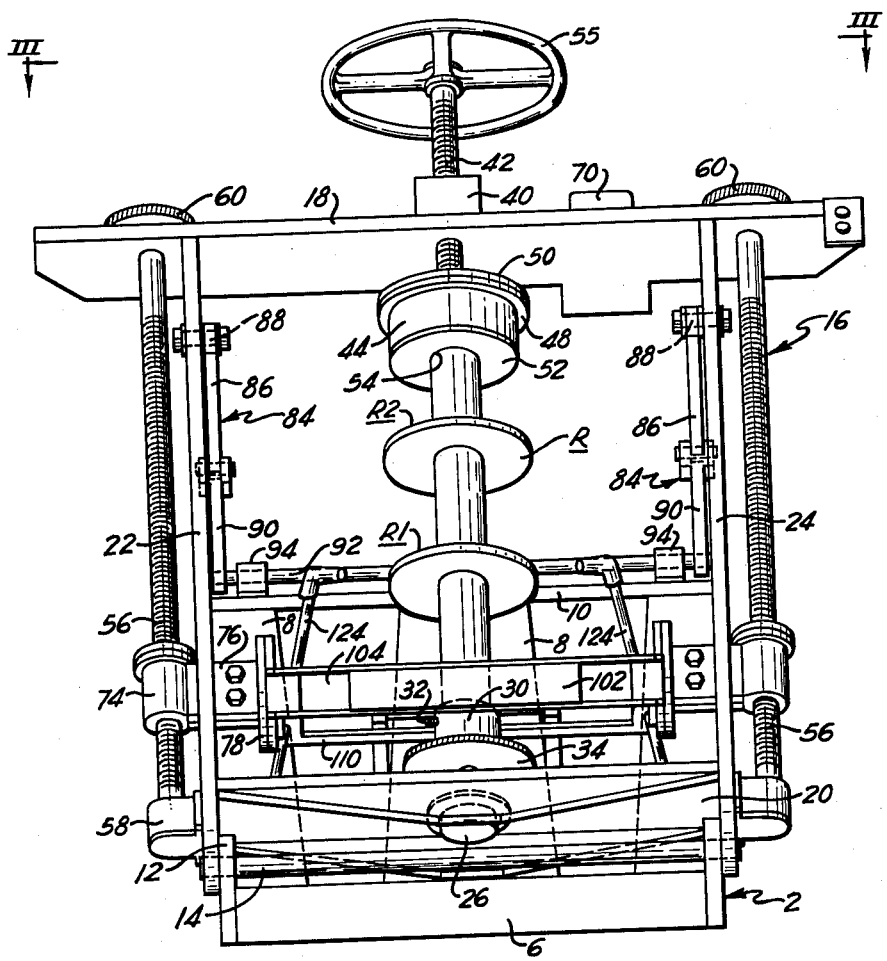
Figure 6:
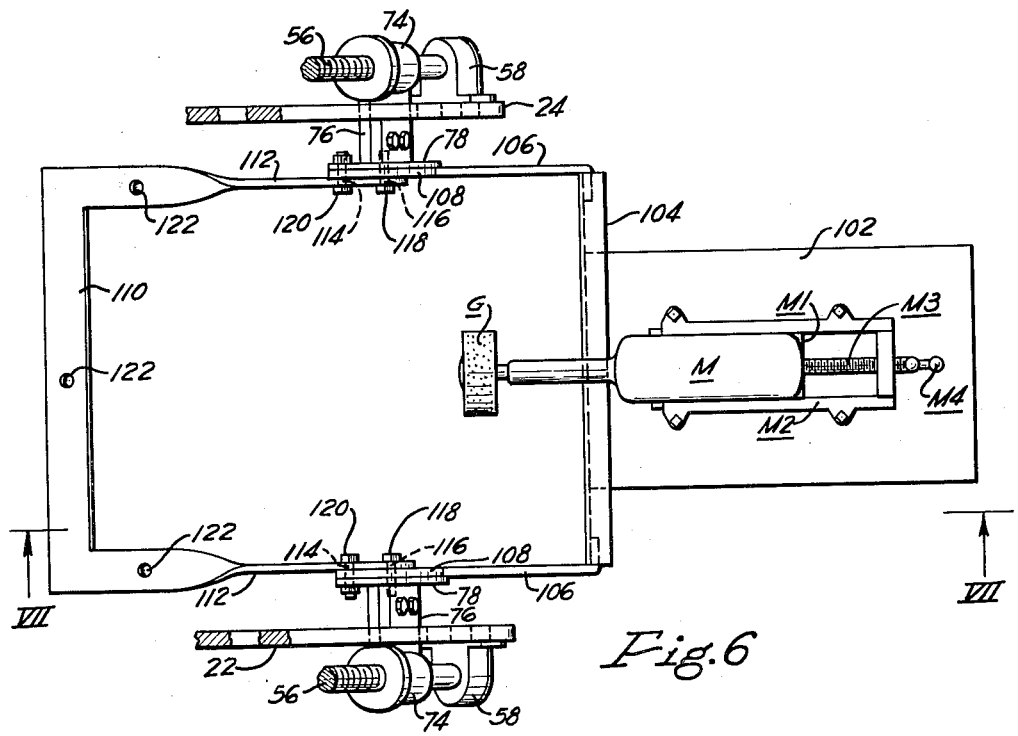
Figure 7:
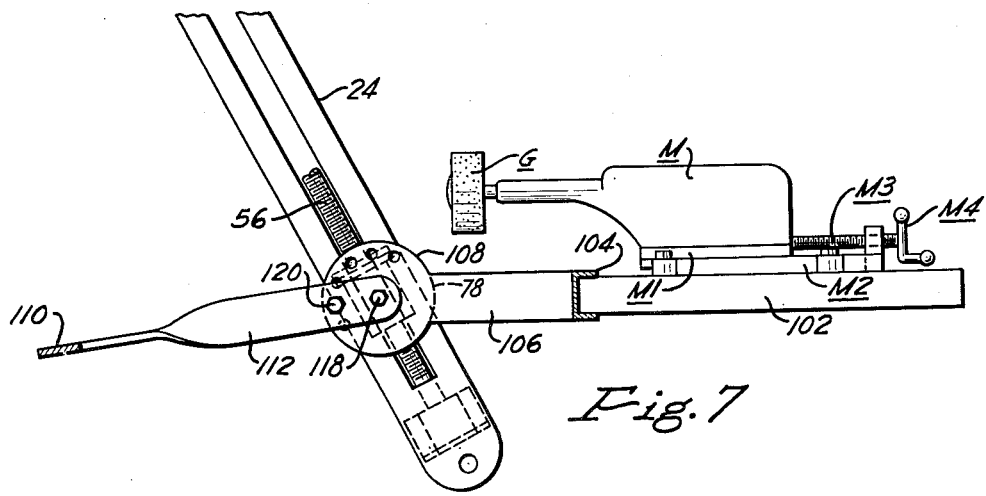

These and other objects will become more apparent after referring to the following specification and attached drawings, in which:

FIGURE 1 is a side elevational view;
FIGURE 2 is a sectional view taken on the line II—II of FIGURE 1;
FIGURE 3 is a top plan view taken on the line III—III of FIGURE 2;
FIGURE 4 is an elevational view of the tilting frame of the invention with parts removed for clarity;
FIGURE 5 is a perspective view of the base frame of the invention;
FIGURE 6 is a plan view showing the grinder in position on the platform of the invention;
FIGURE 7 is a sectional view taken on the line VII—VII of FIGURE 6; and
FIGURE 8 is a front elevational view showing the guard plate and smoked glass plate of the invention.

Referring more particularly to the drawings, reference numeral 2 designates the base of the invention which is in the form of a rectangular frame having parallel sides 4 connected together by parallel end members 6. A plurality of spaced upright supports 8 are mounted on one end of the frame 2 for supporting a table 10. The ends of the side member 4 remote from the supports 8 are each provided with an enlarged flange 12 having a hole therethrough for journaling a pivot bar 14.

A rectangular frame 16 having upper and lower plates 18 and 20, respectively, joined together by and connected with parallel sides 22 and 24 is pivotally mounted on the base 2 by means of the pivot bar 14. A thrust bearing 26 is mounted in the lower plate 20 of the frame 16. A short shaft 28 is journaled in the thrust bearing 26 and projects upwardly to support a roll-neck cup 30 which is adapted to receive one end of the shaft of a twister guide roll R. A set screw 32 is provided in the side of the cup 30 for locking the roll shaft in the cup. A gear 34 is keyed to the shaft 28 between the cup 30 and the thrust bearing 26. The gear 34 is driven by a worm pinion 36 and motor drive 38 which is bolted to the top of plate 20.

The upper plate 18 of the frame 16 has welded thereto a centrally located screw block 40 through which is threaded a screw shaft 42 which carries a housing 44. The housing 44 is provided internally with a frictionless bearing 46 and is adapted to receive one end of the shaft of the roll R. The top of the housing 44 is provided with a peripheral flange 48 which matches with and is bolted to a circular plate 50 welded on the bottom end of the shaft 42. The bottom of the housing 44 is closed by a ring plate 52 which secures bearing 46 in the housing. The ring plate has a center opening 54 for receiving the end of the roll shaft. A hand wheel 55 is keyed on the opposite end of the shaft 42 so that the shaft can be manipulated to raise and lower housing 44 to accommodate rolls of various length.

Screw shafts 56 are mounted on each of the sides 22 and 24 of the frame 16 and extend generally parallel therewith with their bottom ends journaled in thrust bearings 58 which are attached to the lower ends of the sides 22 and 24.

The upper ends of the shafts 56 pass through the upper plate 18 and each has keyed thereon a gear 60. The gears 60 are connected respectively with worm pinions 62 and 64. The worm pinions are driven by worm shafts 66 and 68, respectively. The shafts 66 and 68 are each connected at one end with a motor drive 70. Thus, rotation of shafts 56 is brought about by motor drive 70 through worm pinions 62 and 64, shafts 66 and 68 and gears 60. The shafts 66 and 68 are journaled in bearing blocks 72 mounted on the upper side of plate 18.

A lift nut 74 is threaded on each of the screw shafts 56. An arm 76 is attached to and extends inwardly from each of the nuts 74 through slotted openings in slides 22 and 24 of the frame 16. The free end of each of the arms 76 carries a circular plate 78 which is provided with a threaded center hole 80 and a plurality of peripheral holes 82.

The frame 16 can be tilted relative to the base 2 by means of a power-actuated linkage 84 which consists of a pair of arms 86 each pivotally connected at one end with the upper portions of the sides of the frame 16 by means of wrist pins 86 and a second pair of arms 90 pivotally connected with the first pair at one end and keyed to a shaft 92 at their other end. The shaft 92 is journaled in bearing blocks 94 bolted to the table 10 which is mounted on the upright supports 8. A gear 96 is keyed to the shaft 92 and is in mesh with a worm pinion 98 of a motor drive 100.

A platform 102, having a U-shaped mounting bracket 104 welded to one end, is mounted on the circular plates 78 by means of the bracket 104. The free ends of the side members 106 of the bracket 104 are formed in the shape of circular enlargements 108 each of which is provided with a center hole and a plurality of spaced peripheral holes. The center hole and peripheral holes in each enlargement 108 match the center hole 80 and peripheral holes 82, respectively, in the circular plates 78.

A torch-support 110 is also mounted on the circular plates 78. The torch-support 110 is generally U-shaped in structure having two side arms 112 each of which is provided with two holes 114 and 116 in the free end thereof.

Platform 102 and the torch-support 110 extend generally horizontally in opposite directions from the frame 16. The platform and torch-support are connected to the plates 78 by aligning the center holes of the circular enlargements 108 and holes 116 of arms 112 with the threaded center holes 80 of the circular plates 78. Screws 118 are then threaded into the aligned holes thereby securing the platform 102 and the torch-support 110 to the nuts 74. Pins 120 are inserted through the aligned holes 114 of the torch-support arms 112 and one of the peripheral holes of the circular enlargement 108 of the platform mounting bracket, and one of the peripheral holes 82 of each of the circular plates 78, as best shown in FIGURES 6 and 7. Openings 122 are provided in the torch-support into which preheating torches 124 are inserted and held.

A guard plate 126 is removably mounted on the mounting bracket 104 of the platform 102 and a smoked glass plate 128 is adjustably mounted on the top of the guard plate, as best shown in FIGURES 2 and 8.

The platform 102 serves a twofold purpose, as will be explained more fully hereinafter, in alternately providing a support for the operator's seat and serving as a support for a grinding wheel motor M having a grinding wheel G attached thereto. The grinding wheel motor M is mounted on a base M1 in a guideway M2 for movement toward and away from the frame 16 by means of a screw shaft M3 rotatable by a handle M4.

In operation, the twister guide roll R to be rebuilt is lifted by means of a chain hoist (not shown) so that the inclined roll surface R1 to be rebuilt is facing upwardly. The lower end of the roll shaft is placed in the roll-neck cup 30 and the upper end of the shaft is aligned with the opening 54 of the plate 52 on the bottom of the housing 44. The hand wheel 55 is then rotated to move the housing 44 downwardly over the upper end of the shaft of the roll. The lock screw 32 in the cup 30 is threaded inwardly to secure the roll shaft in the cup and the chain hoist is removed from the roll. The motor drive 100 is actuated to pivot the frame 16 on the bar 14 until the inclined roll surface R1 is in a substantially horizontal plane on the side of the apparatus facing a workman W sitting on the platform 102. The bracket pins 120 are removed and the bolts 118 are loosened so that the platform 102 can be positioned horizontally and the torch-support 110 adjusted so that the preheating torches 124 are aimed at the roll surface opposite R1, as best shown in FIGURE 1. Bolts 118 are then re-tightened and pins 120 re-inserted in their respective aligned holes thereby securing the torch-support 110 and the platform 102 in proper operating position. The preheating torches 124 are then lit and the rebuilding operation is ready to begin with the workman holding an oxyacetylene welding torch in one hand and a Stellite welding rod in the other. It will be noted that the top of the guard plate 126 also serves as a rest for the welding torch and the welding rod.

The workman begins the rebuilding operation by starting to apply weld metal to the surface R1 in the customary manner at the same time he actuates a foot switch (not shown) which starts the motor drive 38 to rotate the roll R at the proper speed. Speed of the roll drive 38 may be adjusted by means of a speed control knob 130 on the motor of drive 38. When one roll surface is rebuilt the workman actuates another switch (not shown) to start the motor 70 which causes the shafts 56 to rotate and lift the nuts 74 upwardly. As the nuts 74 move upwardly on the shafts 56 they carry with them the platform 102 and torch-support 110. The shafts 56 are rotated until the torch-support and platform reach the proper position to resurface the roll element R2.

When the rebuilding operation is completed, the rotation of the roll R is stopped, the welding torch and the preheating torches 124 are extinguished, and guard plate 126 with glass plate 128 attached thereto is removed from the platform 102, and the seat S is removed. Then the grinding motor base M1 is bolted to the platform 102 with the motor M and grinder G disposed thereon. Motor 70 is then operated to adjust the platform 102 to the proper height relative to the surface R2 so that the grinding wheel G makes contact with the roll surface. With the grinding operation begun, motor drive 38 is actuated to again start rotation of the roll at the proper speed for grinding operation. The speed of the motor drive 38 is adjusted for the grinding operation by turning the speed control knob 130. At each complete revolution of the roll, the grinding wheel motor M is advanced inwardly over the roll surface being treated by means of the screw shaft M3. The grinding operation is then similarly performed on the roll surface R1 by lowering platform 102 and adjusting the position of the grinder as heretofore described.

Although the apparatus of the invention has been described as used for rebuilding a roll it will be noted that the apparatus could also be utilized for forming a roll surface with a burning torch. Also, it will be understood that rolls of types other than twister guide rolls can be processed with the apparatus of my invention.

While one embodiment of my invention has been shown and described, it will be apparent that other adaptations and modifications may be made without departing from the scope of the following claims.

I claim:

1. Apparatus for supporting a roll having a neck at each end for processing, which comprises a first generally horizontal frame constituting a base, an upwardly inclined frame pivotally mounted on said base frame, said inclined frame being substantially rectangular in shape and having vertically spaced top and bottom walls and spaced side walls extending between said top and bottom walls, a screw shaft threadingly disposed in said top wall and projecting above and below thereof, a housing carried by the end of said screw shaft projecting below said top wall, an anti-friction bearing in said housing adapted to receive one neck of said roll for rotation therein, said housing and bearing being adjustable toward and away from said bottom wall upon rotation of said screw shaft, and a roll-neck cup rotatably mounted on said bottom wall below said housing adapted to receive the neck on the opposite end of said roll.

2. Apparatus as defined by claim 1 including power means connected with said roll-neck cup for rotating the same.

3. Apparatus as defined by claim 1 including a power-operated linkage mounted on said base frame and connected with said inclined frame for tilting said inclined frame relative to said base frame.

References Cited in the file of this patent

UNITED STATES PATENTS

| | | |
|---|---|---|
| 1,326,783 | Putnam | Dec. 30, 1919 |
| 1,328,763 | Putnam | Jan. 20, 1920 |
| 1,450,511 | Nielsen | Apr. 3, 1923 |
| 2,041,984 | Veterino | May 26, 1936 |
| 2,182,743 | Clergy | Dec. 5, 1939 |
| 2,324,919 | Fine et al. | July 20, 1943 |
| 2,558,055 | Meredith | June 26, 1951 |
| 2,593,738 | Dollahite | Apr. 22, 1952 |